US010760718B2

(12) United States Patent
Sidgman Saitua (10) Patent No.: US 10,760,718 B2
(45) Date of Patent: Sep. 1, 2020

(54) DEVICE FOR WELDED JOINTS IN PIPEWORK (71) Applicant: Rene Eduardo Sidgman Saitua, Santiago (CL)

(72) Inventor: Rene Eduardo Sidgman Saitua, Santiago (CL)

(*) Notice: Subject to any disclaimer, the term of this patent is extended or adjusted under 35 U.S.C. 154(b) by 0 days.

(21) Appl. No.: 16/075,101

(22) PCT Filed: Aug. 23, 2016

(86) PCT No.: PCT/CL2016/000048
§ 371 (c)(1),
(2) Date: Feb. 14, 2019

(87) PCT Pub. No.: WO2018/035623
PCT Pub. Date: Mar. 1, 2018

(65) Prior Publication Data
US 2019/0178424 A1   Jun. 13, 2019

(51) Int. Cl.
*F16L 13/02*    (2006.01)
*F16L 13/00*    (2006.01)
(Continued)

(52) U.S. Cl.
CPC ......... *F16L 13/0263* (2013.01); *F16L 13/00* (2013.01); *F16L 13/02* (2013.01); *F16L 13/0218* (2013.01);
(Continued)

(58) Field of Classification Search
CPC ......... F16L 9/18; F16L 13/02; F16L 13/0209; F16L 13/0218; F16L 13/0263; F16L 13/0272
(Continued)

(56) References Cited

U.S. PATENT DOCUMENTS 3,026,910 A * 3/1962 Cawker ............... G01F 1/42
285/288.1
4,640,532 A * 2/1987 Pope ............... F16L 13/0263
285/288.1
(Continued)

FOREIGN PATENT DOCUMENTS

CN    101270841 A    9/2008
CN    202914913 U    5/2013
(Continued)

*Primary Examiner* — David Bochna
(74) *Attorney, Agent, or Firm* — Patshegen IP LLC; Moshe Pinchas

(57) ABSTRACT

A piping device that includes two parts, each consisting of two concentric rings joined together by a solid steel mantle that when assembled produce a confined space between the pieces of at least 50 mm and house a guide wedge and an elastomeric ring that It produces the hydraulic seal and the thickness of this solid steel mantle and the assembly area between the cavity and the guide wedge is at least twice the thickness of the pipe. The heat of the welding process between the external concentric rings is released by the device itself and the temperature inside the pipe does not exceed 120°+/−20° C., eliminating any possible internal corrosion in the areas of the welded joints, since it prevents damage to the internal lining and increases the useful life of the pipe during it operation.

6 Claims, 12 Drawing Sheets

BB Cut

Detail D (51) Int. Cl.
*F16L 58/18* (2006.01)
*B23K 101/06* (2006.01)
(52) U.S. Cl.
CPC ........ *F16L 58/181* (2013.01); *B23K 2101/06* (2018.08)
(58) Field of Classification Search
USPC .................................................. 285/288.1
See application file for complete search history.

(56) References Cited

U.S. PATENT DOCUMENTS

| | | | | |
|---|---|---|---|---|
| 7,793,992 | B2 * | 9/2010 | Pionnetti | F16L 13/02 285/288.1 |
| 2006/0267340 | A1 * | 11/2006 | Galatello Adamo | F28D 7/106 285/288.1 |
| 2008/0149210 | A1 * | 6/2008 | Pionetti | F16L 9/18 285/288.1 |
| 2010/0230953 | A1 * | 9/2010 | Baylot | F16L 13/02 285/288.1 |

FOREIGN PATENT DOCUMENTS

| | | | | |
|---|---|---|---|---|
| CN | 103574197 A | | 2/2014 | |
| JP | 04312278 A | * | 11/1992 | ............. F16L 13/02 |
| JP | 3096561 B2 | | 10/2000 | |

* cited by examiner

AA Cut

BB Cut

CC Isometric Cut

Detail D

Figure 10

Detail E

Figure 11

Detail D

Figure 12

DEVICE FOR WELDED JOINTS IN PIPEWORK

FIELD OF APPLICATION

The construction of carbon steel pipelines for the transport of fluids is made by the successive joining of pipes of standard length (6 meters, 12 meters, 18 meters). In these lengths, the pipes are processed and coated on the inside and outside in a workshop to be subsequently used in the field. Both, internal and external coating protect the pipe against corrosion and are specified by the engineer according to the project requirements.

It is important to note that there are conceptual differences between piping and tubing in terms of diameter and thickness. However, when the pipeline is a structural element is referred as piping and when is designed only for conveyance, without structural requirement, is referred as tubing. For example, a heat exchanger uses tubing and the transport of fluids over large extensions is done through piping. In keeping with the above, this patent application is applicable to carbon steel pipes with diameters greater than or equal to 152.4 millimeters (6 inches), and includes all the regulations applicable to the same.

Carbon steel is used in pipelines to transport water (industrial, salty or potable water), oil and gas pipelines, fire-fighting systems, condensates, steam, compressed air and any other fluid used in engineering activities. As for corrosive fluids, the carbon steel pipe shall be protected against corrosion with a suitable coating. Paint is the most widely used anticorrosive coating and is applied in the workshop on the inside and outside of the piping. The paints can be liquid, or in the form of powder such as the fusion bonded epoxy (FBE) or dipping systems.

The inner coating used in pipes that transport fluids is formed by patterns of two or three layers of paint of 0.5-0.8 millimeters in thickness. These patterns must have very good adhesiveness to the base metal and between layers, forming a continuous and homogeneous whole and are designed considering the chemical and physical characteristics of the fluid transported by the pipe.

Other types of inner coatings for carbon steel pipes are plastic liners, which are inserted inside the pipe and have an outer diameter equal to or slightly greater than the internal diameter of the pipe. The contact between the liner and the pipe is just superficial, there is no adhesion to the metal. Plastic liners are recommended for pipes that transport highly abrasive fluids such as slurry or ore concentrates.

The coatings which the present application refers to are paints or other coatings 100% adhered to the metal; it does not include plastic liners or all those that are placed on the inner side of the metallic pipe, without adherence to the same.

When MIG or arc welding joints are used in the piping construction, the temperature at the welding point exceeds 1300° C., a situation that damages, burns and carbonizes the inner and outer coating up to 20 millimeters off the welding point, leaving these areas with bare steel. The outer coating can be repaired during the construction of the pipe without affecting the execution time of the work; however, the repair of the inner coating requires staff, equipment and procedures that may hinder the work. Given the complexity of repairs inside the pipeline, the likelihood to perform high quality repairs is low, even more, if no technical inspection to certify or ensure the quality of the same can be performed. For the same reason, the inner coating is often not repaired, and the pipe remains exposed to early corrosion of the joints from the beginning.

In addition to destroying the coating around the welded joint, the welding process creates a zone affected by heat (ZAC) around the joint. The drawback of this ZAC is that it gives rise to residual stresses that are transformed into critical sectors of the system since they correspond to anodic centers in which the corrosion damage is locally accelerated. Since there is no anticorrosive protection in this area, the corrosion will accelerate at a rate and speed determined by the characteristics of the fluid transported by the pipeline.

For example, a pipeline 120-kilometer in length built with 12-meter-long pipes will require 10,000 welded joints resulting in 10,000 critical zones along the pipeline due to the destruction of the inner coating.

When the corrosion damage appears as breaks, it forces to stop the operation, creates difficulties to the continuity of the process and restricts the useful life of the pipe. The direct cost associated with the repair is high but often irrelevant compared to the indirect cost associated with the stop of the operation.

Objective

The main objective of this patent application is to provide an easy, efficient and permanent solution to corrosion problems occurring inside the carbon steel pipes in the welded joints areas.

State of the Art

The main industries that require to transport various types of fluids through pipelines are the mining, health, energy and petrochemical industries.

The carbon steel is the most widely used material in pipelines because it has high mechanical strength, withstands high pressures, is easy to weld and the cost is lower compared to other materials such as stainless steel that has very good chemical resistance to many aggressive fluids and does not need coating protection. The limiting factor of the stainless steel is the welding process because if the residual stresses are not released it is exposed to corrosion in the welded joints areas.

HDPE, FRP and PVC pipes are also used but have a limited mechanical strength and resistance to work under high pressure.

The carbon steel pipes are designed according to the mechanical and transport requirements associated with the specific project. The characterization of the pipe with respect to the design, diameter, wall thickness and steel type is defined by the engineer according to the international standards (ANSI, ASME, API, AWS, ISO, ASTM, DIN, and others).

The pipelines can be placed directly on the ground (aboveground) or under a sand bed. Long pipelines should be buried to protect the pipes and/or people.

The pipe joints used in the pipeline can be mechanical or welded, where the welded pipe is watertight and has greater resistance for work at high pressure.

The mechanical pipe joining systems use bolts to secure the coupling. The most commonly used coupling systems are flanges, Victaulic and Dresser. Among the main drawbacks of these types of joining systems is the failure of gaskets and seals causing leakage and crevice corrosion, and many of these are not suitable in networks requiring high pressure work. These types of joints are basically considered for pipelines supported on the ground because they allow easier detection of the point of failure.

Welded joints are preferred in underground pipelines; however, the problem is that the welding heat burns and locally destroys the inner coating.

To produce electrochemical corrosion, it is necessary that four elements coexist: an anode, a cathode, an electrolyte and a conductor. By eliminating at least one of these, corrosion is eliminated or stopped. Anticorrosive coatings act by eliminating the action of the electrolyte.

Carbon steels are alloys that, due to their chemical composition and metallurgical characteristics, have different electrochemical potential on their surface, generating anodic (corrosion) and cathodic (protection) zones. As both are on the same surface and adjacent to each other, electrochemical cells are created that in contact with an electrolyte produce corrosion with dissolution and loss of material in the anodic zones.

According to the requirements of use, the market offers different types of carbon steels that differ in their chemical composition and have different electrochemical potential. For the same reason, the contact between them in the presence of an electrolyte can generate a galvanic cell causing accelerated corrosion of the most anodic one. The electrodes to weld carbon steel must be compatible with the steel of the pipe and therefore are selected accordingly.

Regarding losses from corrosion, a distinction should be made between direct and indirect costs. The direct costs correspond to failure repair and the indirect costs to the lessen or loss of production due to the stop for repair. Depending on the magnitude and/or place of the failure, the indirect cost may be several times greater than the direct cost.

The figures related to damage from corrosion are very high and there are no global records. However, studies carried out by the US National Association of Corrosion Engineers (NACE) indicate that, in direct costs alone, the overall loss from corrosion in 1998 in the USA was in the order of 3.1% of the Gross Domestic Product and the those related to only pipelines was in the order of 0.54% of GDP (47.9 billion dollars). In addition, a report made by Alberta Energy Regulator of Canada in the year 2013, states that of the total of pipe faults between the years 1990 and 2012, 54.8% correspond to internal corrosion.

Through the search of available literature and the review of recent major global piping projects, the conclusion is that, at present, the market does not offer solutions to the problems of internal corrosion in the welded joints area.

The comparative analysis between this patent application and the existing bibliography is as follows:

Invention Patent GB709794, 2 Jun. 1954:

The purpose of this patent is only to avoid the deposit of welding slag and blobs into the pipe.

The design considers an annular chamber that serves as a container of welding blobs and slag, it does not include or mention the protection of the inner coating in the welded joints area.

As it does not consider sealing the crevice that connects the annular chamber with the fluid inside the pipe, it will enter the chamber causing corrosion inside the chamber as well as crevice corrosion, that is, this invention does not resolve the problem of internal corrosion in the joining areas of the pipes, which is the main objective of this patent application.

The former analysis shows that the field of application and purpose of the patent differs absolutely from that of this patent application request.

Invention Patent U.S. Pat. No. 4,640,532A, 3 Feb. 1987:

The invention described in this patent uses a forced circulation cooling fluid which may be water, cool air or other, to reduce the welding heat. That is, the inventive concept is the absorption of heat by means of an additional element, without which it does not achieve the desired effect. Given the above, the invention of this patent requires the use of compressors, power generation equipment and pumps that increase the complexity and costs of the piping, not to mention that it requires permanent temperature monitoring at the time of welding and to interrupt this process when the temperature exceeds certain limits, that is, the welding process will be restricted and subject to the temperature decrease to desirable levels, a situation that is not technically feasible and impracticable.

The analysis of this patent shows that the invention was designed for pipes which only use plastic liners as an inner liner for abrasive fluids, that is, high density fluids with high content of suspended solids (slurry, ore concentrate, etc.).

It also shows that, after the welding is finished, the space between the grooves through which the cooling fluid circulates must be filled with a liquid epoxy resin. The epoxy resins polymerize and cure by the addition of a curing agent which forms part of the final product. The reaction between these components is exothermic and depending on the volume of resin, the heat released can exceed 250° C. As the system can no longer be cooled since the grooves were filled with the epoxy resin, the heat released could be transmitted through the metal of the pipe to the liner by melting or degrading it.

The invention patent is almost 30 years in existence and, apparently, to date, has not had any industrial application, considering that its owner Mc CONELL DOWELL CONTRUCTORS Ltd. is a company of industrial assemblies. This fact of no industrial application is not a price issue since the same patent states that the invention is more economical than the flanges commonly used in liners coated with plastic liners, and technical-economic analysis would indicate that the main obstacle to use this patent at industrial scale is the high level of complexity associated to its implementation and the fact that it does not resolve the corrosion problem of the pipe joints because the device has an unsealed gap between the liners which creates crevice corrosion, that is highly destructive.

In summary, it is possible to conclude that the design, engineering, type of inner coating, welding heat attenuation system, type of fluid, inputs and the complexity of the implementation of the patent formerly described, are totally different from the scope, objective and field of implementation of the patent described in this patent application request.

Invention Patent WO 2008/113248A1, 25 Sep. 2008:

Like the aforementioned U.S. Pat. No. 4,640,532A, the invention cited in this patent uses a cooling fluid as a welding heat attenuation system which flows through a small groove located under the sector to be welded, that is, the inventive concept is the absorption of the heat by means of an additional element, without which it does not achieve the intended result. Hence, this invention requires power generation equipment, compressors, and pumps which hinder the constructive procedure from what is normally done.

The holes through which the coolant is injected and circulates require to be sealed and covered; therefore, the diversity of equipment, materials and supplies required for field application of this invention, increases the costs, deadlines and complexity during piping construction.

In summary, the design, engineering, heat attenuation system, installation requirements, supplies and complementary procedures for the field application of this patent make it non-comparable or equivalent to the patent of this patent application request.

Invention Patent GB1359676A, 10 Jul. 1974:

This invention relates to tubing for the transmission of waves, used originally for telecommunications. It is designed for tubes containing air or other elements and not for pipes to transport fluids such as water or saline solutions. The norms and technical requirements that govern the communications engineering are typical of this field and different from those that apply to piping carrying fluids.

The inner lining of the steel pipe described in the patent considers the application of two types of products, forming a duplex system, and corresponds to a conductor metallic coating such as copper, aluminum, tin, etc., and a dielectric coating for the finishing which can be varnish, resin, paint or plastic. Duplex coatings cannot be used in fluids having conductive characteristics (electrolytes) since the electrochemical potential of the base coat metal is different from carbon steel and the contact between them will generate a galvanic cell which, in the presence of an electrolyte, will damage the most anodic metal and will be consumed by the most cathodic metal. In that sense, the copper and tin metals are cathodic with respect to carbon steel and in the presence of an electrolyte such as water or saline solutions the coating will damage the pipe, while the aluminum coating is anodic with respect to the carbon steel and will be consumed by the pipe. Dielectric coatings, on the other hand, exhibit limited chemical and liquid water resistance and are applied in a very thin single-layer (not more than 0.2 millimeters). Both situations preclude the use of these dielectric coatings against a permanent and continuous flow of water or saline solutions.

In addition, this invention includes three parts, two terminals and a flange that works as a bridge to perform the welding of tubing joints over the main tube. This method prevents the damage to the coating, but does not inhibit the corrosive processes of the joint itself, in particular, crevice corrosion produced in the connection point of the two tubes, an area that is not protected and that, in the presence of moisture or other agent, will trigger a corrosive process that will be accelerated due to the damage of the coating.

This invention dates to 1974 and, at present, this technology has been replaced by the fiber optic.

In summary, the field of application, design, engineering, coating qualities and mechanical properties of this patent is not comparable and does not relate to or equivalent to the patent of this patent application request.

Invention Patent U.S. Pat. No. 2,273,154A, 17 Feb. 1942:

This invention defines the protection of the inner lining around welded joints by the overlapping of two tubes in which one is inserted into the other. The inner tube creates an obstacle and narrowing of the internal wall of the tube that will alter the free flow of the fluid causing micro turbulence. This effect worsens if the obstacle is located against the flow. In addition to prevent the fluid transport, the inner tube produces a crevice in the internal wall of the tube which will accelerate the corrosion of the same.

The design of this patent from February 1942, considers parts complex to manufacture and does not consider guides for an adequate assembly and coupling of the parts during the construction of the pipeline.

In summary, the concept, design, engineering, singularities, mechanical and hydraulic properties and manufacturing complexity of this invention are completely different and not comparable with those of the patent application filed in this request.

Invention Patent CN103574197A, 2 Dec. 2014:

This invention does not establish minimum dimensions of the parts and pieces that make up the invention, which are essential to ensure the spontaneous dissipation of the welding heat and the necessary mechanical strength to high pressures and earthquakes, that is, the proposed design alone does not allow the engineer to define the conditions required for a successful implementation of the invention, where the thickness of the main pipe is an key reference level for the optimal behavior of the pipeline.

In addition, this invention does not resolve the problem of crevice corrosion corresponding to the three crevices generated in the lower zone between part 1 and the pipe; between parts 1 and 2; and between part 2 and the pipeline.

In summary, the singularities and mechanical conditions of this invention are not clear and may even be erratic in that they do not limit the problem in a global way as the patent application presented in this request does.

Conclusions of the Bibliographic Search:

As stated above, the cited patents present concepts, objectives and fields of application that are not comparable or equivalent to the present patent application and, at present, there is no method that guarantees an industrial application that satisfies and/or solves the problem of corrosion in the carbon steel pipe joints area.

In addition to the engineering of carbon steel pipe installation projects, the works executed worldwide over the last decades do not show evidence that this problem has been resolved.

Problems to be Solved

The main reasons for corrosion inside the carbon steel pipes are due to failure or absence of inner anticorrosive coating and the generation of heat affected zones (ZAC, acronym in Spanish).

Hence, the solution is to build pipelines with a device or system that allows to weld the joints without damaging the inner coating of the pipe as well as to avoid that ZAC are generated inside the pipe.

The following is a solution that satisfies both considerations and meets the design, operational and constructive requirements governing the engineering for the transport of fluids.

Other problems resolved by this solution:

a. Given its shape, design, height and dimensions, the device which is the subject matter of this patent application allows to dissipate the welding heat by itself, spontaneously and naturally, with no need of external cooling or additional or complementary elements that may complicate the work during the assembly and/or increase the piping construction cost.

b. The capacity to reduce the temperature in the welded joints area is constant, reproducible and independent of atmospheric variables.

c. By assembling the fittings in the field, containing the parts 1 and 2 of the device, an exact, continuous and homogeneous separation of 2 to 3 millimeters is achieved in the bevel of the outer rings that facilitates the welding process.

d. During the welding process in the central bevel of the rings that make up the device, the temperature in the inner wall of the pipe does not exceed 120° C.+/−20° C., a condition that is supported by any kind of paints used inside the pipes and, therefore, the inner coating applied in the workshop remains intact in the welded joints area during the construction of the pipeline.

e. This maximum temperature range (120° C.+/−20° C.) achieved with the device is applicable to pipes of all thicknesses and diameters equal to or greater than 152.4 millimeters (6"), using MIG and Arc welding systems.

f. It allows to use all type of paints designed by the engineering without damaging or destroying the coating. They include those specified in the AWWA standards and any other relevant standard or specification.

g. During the construction of the pipe it eliminates the imperative need to repair the inner coating.

h. It ensures the elimination of any critical center that can cause corrosion, both in the joints between pipes as in the device itself.

i. It has industrial application, that is, it complies with the ASME, ANSI, API and ASTM standards, which are the main standards that govern the piping design in terms of mechanical and hydraulic requirements.

j. The welding procedure is independent of any external condition and can be standardized for each project according to the AWS standard.

k. In addition to complying with the requirements of the international pipe design and engineering standards, the use of the device allows the normal pipe construction standards and procedures to be observed, without interfering with the regular pipe construction practices.

l. It allows savings during the piping construction, as much for shortening the project deadlines as for the ease of work.

m. The welded parts at each end of the pipe are robust and prevent the pipe to lose shape during transportation, handling and storage, avoiding the need to correct any possible distortion in the pipes when joining them. Likewise, there is no need of crossbars at the pipe ends.

n. The diameter of the outer ring of the parts that make up the device is greater than that of the pipe and protrudes from it, so it acts as a tread and keep the pipe separated from the ground, what reduces the damage to the outer coating and hence, the repair costs of the same.

o. The device has a simple design, easy to manufacture, firm, tough, which by eliminating the corrosion in the welded joints area, extends the service life of the pipe, producing significant savings both during the construction and the operation of the pipeline.

p. After welding the pipes in the field, the original factory coating remains unaltered and therefore, the anticorrosive protection in the joints maintains the same quality as in the rest of the pipe, eliminating any critical point of the system.

q. As the device proposed in this patent application does not require corrosion maintenance, it ensures a very long service life and reliability during the operation.

r. The device proposed in this patent application solves the problem of internal corrosion in pipe joints, which is the major problem in this area of engineering that has not been yet resolved globally.

DESCRIPTION OF THE FIGURES

The Figures shown in this patent application are the following.

DETAILED DESCRIPTION OF THE DEVICE

This device to be installed in pipes, eliminates the internal corrosion at the welded joints by preventing the welding heat to damage the inner coating of said pipes, dissipating it in a natural and spontaneous way, that includes a first part (1) which is assembled to a second part (2) generating a confined space (51) where both parts (1 and 2) are formed by two concentric rings, one inner ring (4, 21) of the same diameter as the pipe (38), and an outer ring (3, 20), with the rings joined together by a solid steel mantle (5, 22); the inner ring (4) has a cavity (8) where the guide wedge (29) of the inner ring (21) is assembled and at the bottom of the cavity (8) of the first part (1) there is a concavity (9) to accommodate a cylindrical fluorelastomer ring (45) and at the end of the guide wedge (29) of the second part (2) there is a concavity (30) confining said cylindrical ring (45) to the concavity (9), and the inner area of the contact surfaces (39) between the inner rings (4, 21) are protected with a highly adhesive epoxy seal, and by the type of assembly (52) of parts (1 and 2), a separation of 2 to 3 millimeters (46) is achieved between the outer rings (3, 20) where the welded joint (44) is done, where the width (10, 23) of the solid steel mantle (5, 22) that separates the inner and outer rings of both parts (1 and 2) is at least 50 mm and the thickness (14, 24) of this solid steel mantle (5,22) as well as the thickness of the assembly area (52) between the cavity (8) of part (1) and the guide wedge (29) of part (2) is at least twice the thickness of the pipe (40, 41).

Likewise, the inner ring (4) has a minimum width (12) of 30 millimeters plus twice the thickness of the pipe (40, 41) plus the width of the welding neck (18) and the inner ring (21) has a minimum width (32) corresponding to the width of the guide wedge (29) plus 20 millimeters, plus twice the thickness of the pipe (40, 41) plus the width of the welding neck (26).

On the other hand, the outer rings (3 and 20) have a minimum outer diameter (11 and 33) equivalent to the inner diameter of the pipe (38) plus 100 millimeters, plus 6 times the pipe thickness (40, 41) and the minimum width (16 and 34) of these rings is at least 23.5 millimeters plus twice the thickness of the pipe (40, 41).

The cylindrical fluorelastomer ring (45) acts as a tight seal preventing the fluid transported by the pipe (50) to enter and cause corrosion inside the confined space (51) and the contact area (39) of both faces of the inner rings (4, 21) where the epoxy seal is applied, has a minimum separation of 0.5 millimeters with a maximum clearance of +/−20% which prevents electrical contact between the faces forming the crevice (47), preventing crevice corrosion in the device.

In keeping with the same, a carbon steel device is manufactured which includes two parts (1 and 2) which, when welding them in the field to build the pipe, most of the welding heat dissipates naturally and spontaneously through the device itself (FIG. 12), without damaging the pipe wall.

The description, structure and dimensions of the parts that make up the device are shown in FIGS. 1 to 6, which are detailed below.

Figure 1:
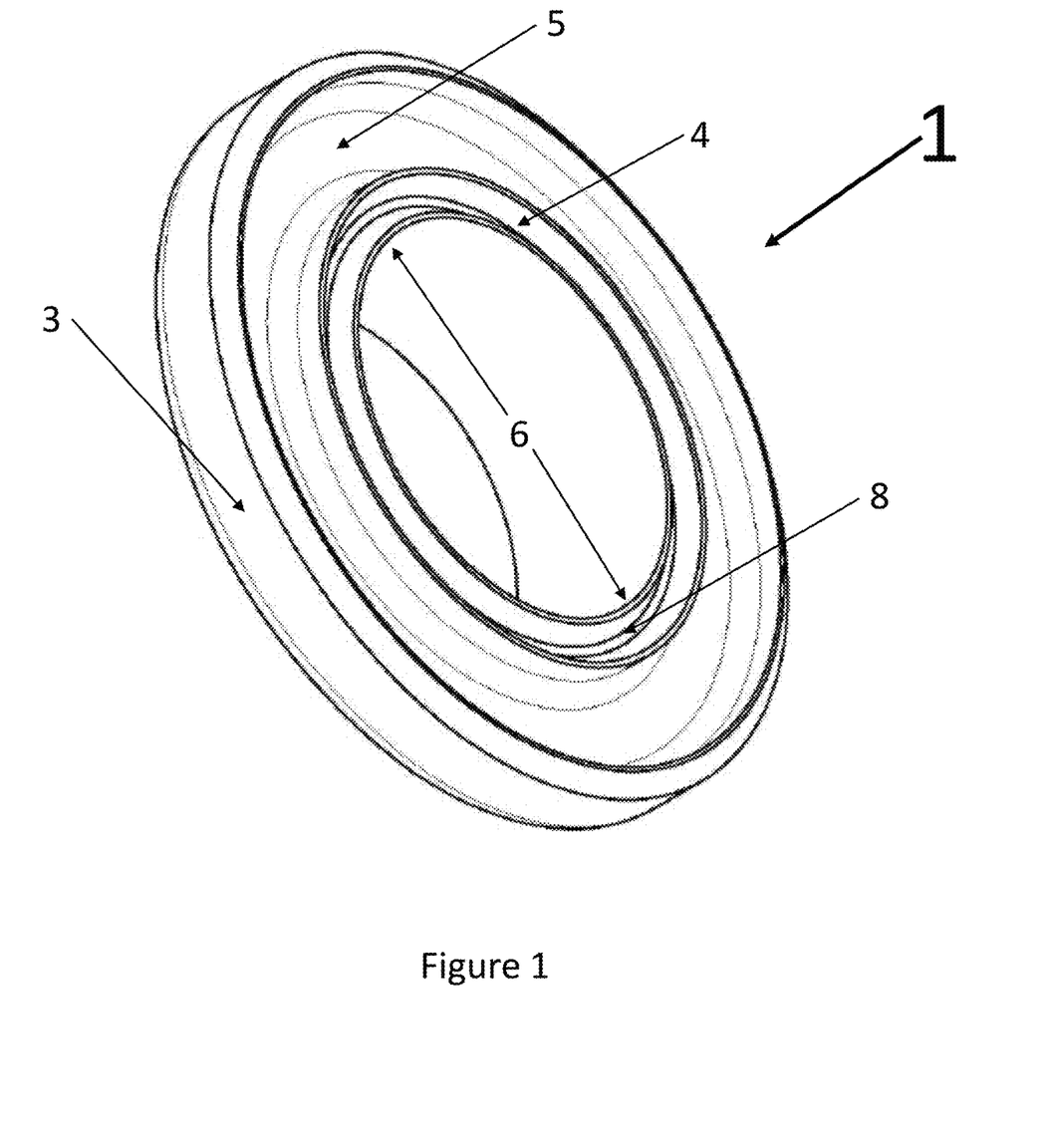
FIG. 1: Part 1
Figure 2:
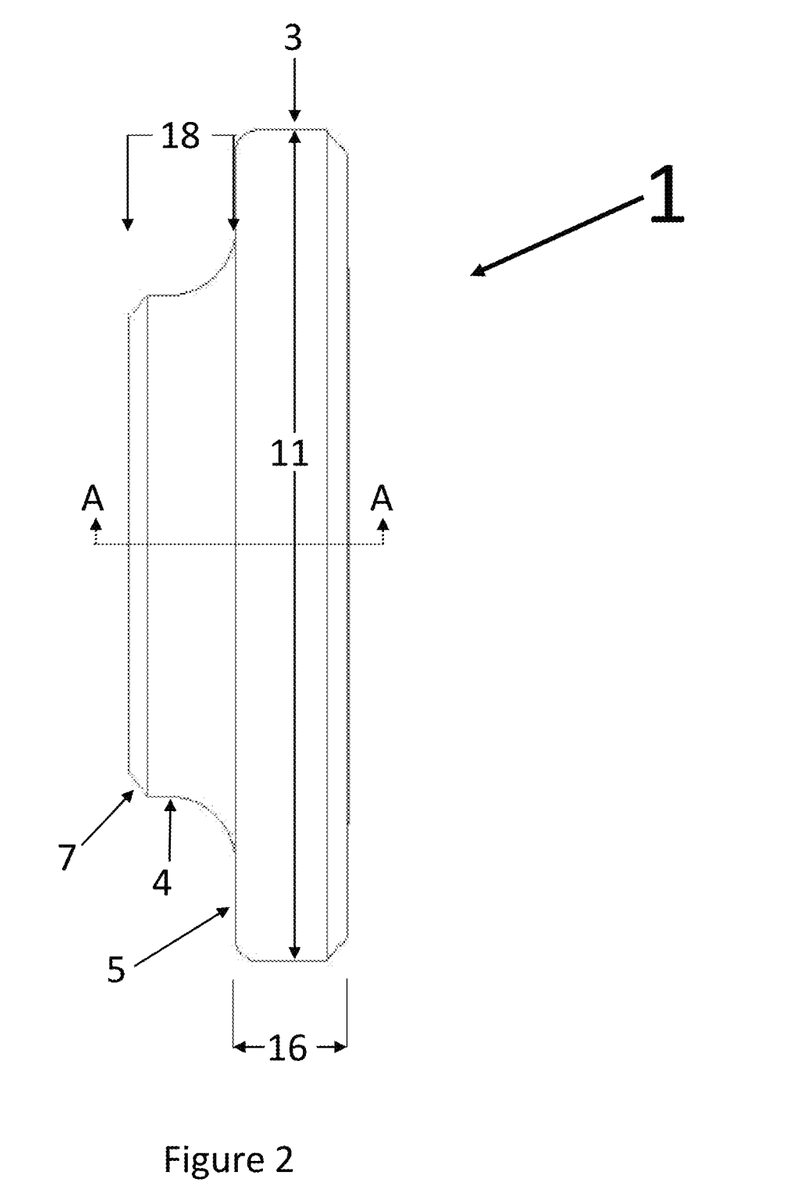
FIG. 2: Part 1. Front View
Figure 3:
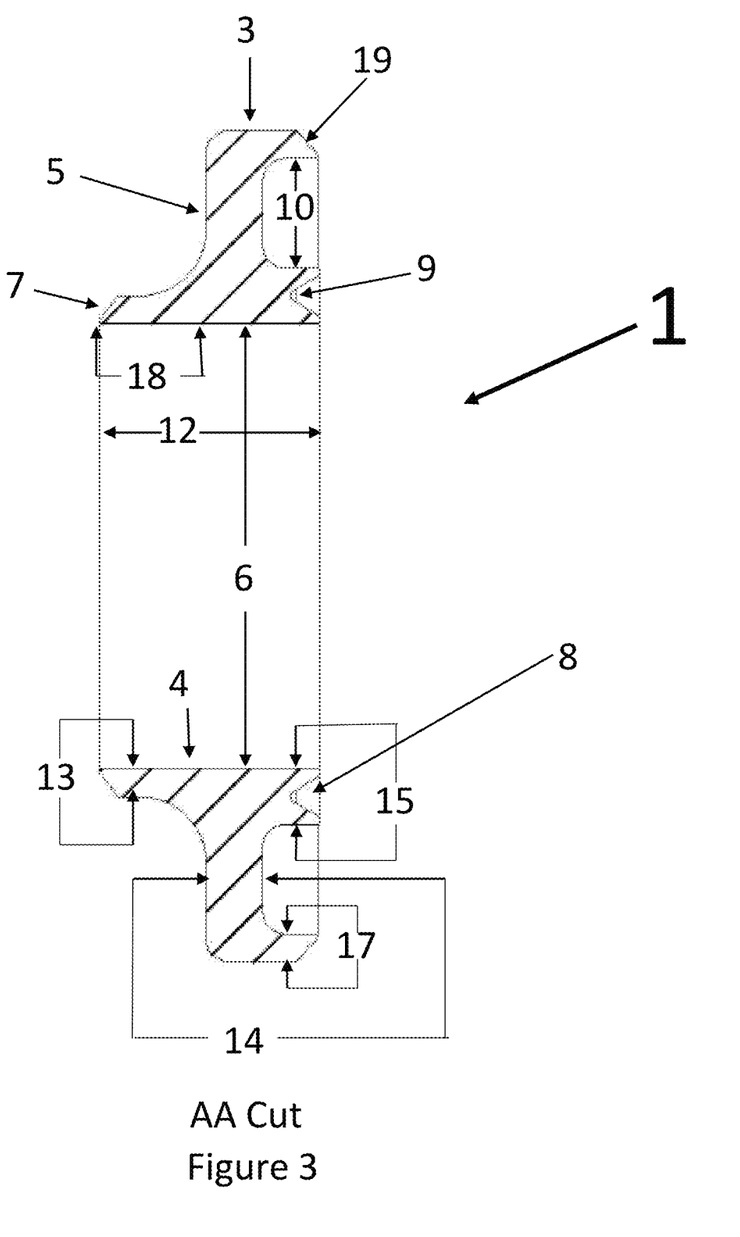
FIG. 3: Part 1. Section AA of the Front View

Part 1 (FIGS. 1, 2 and 3):

Part (1) is formed by two concentric rings, an outer (3) and an inner ring (4), joined together by a solid steel mantle (5). The clearance between these rings (10) should be at least 50 millimeters. The thickness of the mantle (14) joining the rings should be at least twice the pipe thickness (40, 41).

The inner ring (4) corresponds to the area of the device through which the fluid carried by the pipe (50) travels and therefore must have the same inner diameter (6) as the diameter of the pipe (38). The thickness (13) of the inner ring (4) in the coupling area should be the same as that of the pipe (40, 41) and the thickness (15) in the assembly zone with the part (2) must be at least twice the thickness of the pipe (40, 41). The inner ring (4) is welded (42) to the pipe on a beveled (7) welding neck (18). The minimum width (12) of the inner ring (4) should be 30 mm+twice the thickness of the pipe (40, 41)+the width of the welding neck (18).

The inner ring (4) has a cavity (8) to couple and guide part (2), the bottom of this cavity is concave (9) intended to house a cylindrical fluorelastomer ring (45) preventing the fluid from passing into the body of the device, sealing hermetically the joints between the parts (1 and 2). This cavity (8) must have a minimum depth of 10 millimeters.

The outer ring (3) has a minimum outer diameter (11) equivalent to the inner diameter of the pipe (38)+100 mm+6 times the pipe thickness (40, 41). The minimum width (16) of the outer ring (3) should be 23.5 mm+twice the pipe thickness (40, 41). The thickness (17) of the outer ring (3) should correspond to at least the thickness of the pipe (40, 41) and its finishing should be beveled (19) to be welded to the outer ring (20) of part (2).

Figure 4:
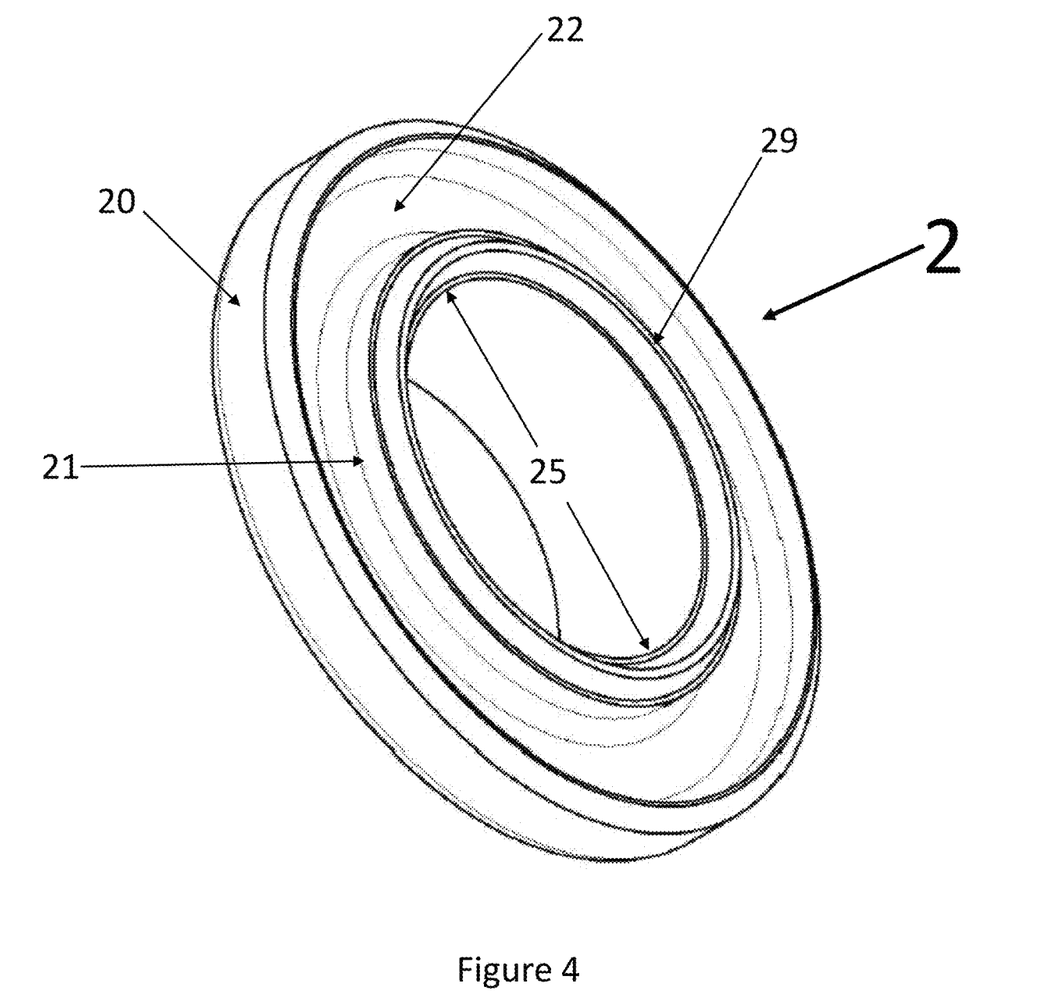
FIG. 4: Part 2
Figure 5:
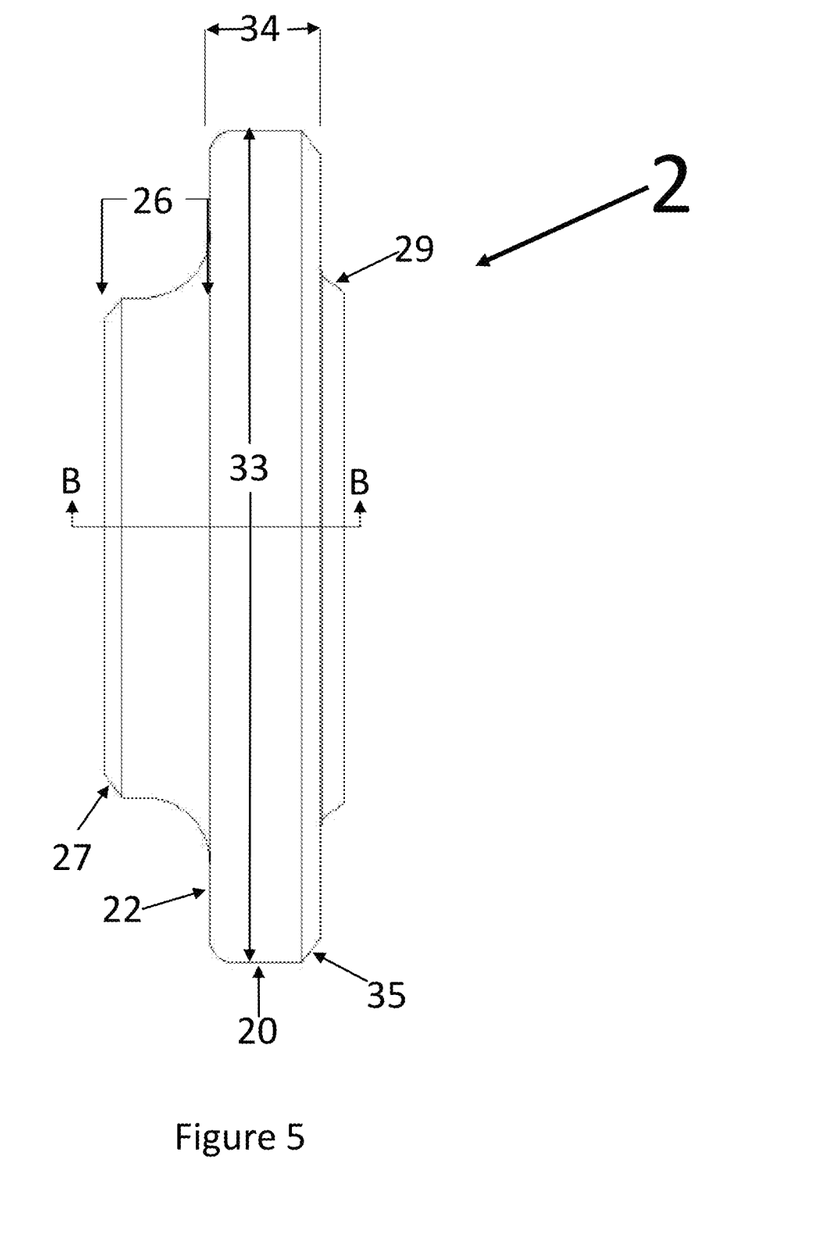
FIG. 5: Part 2. Front View
Figure 6:
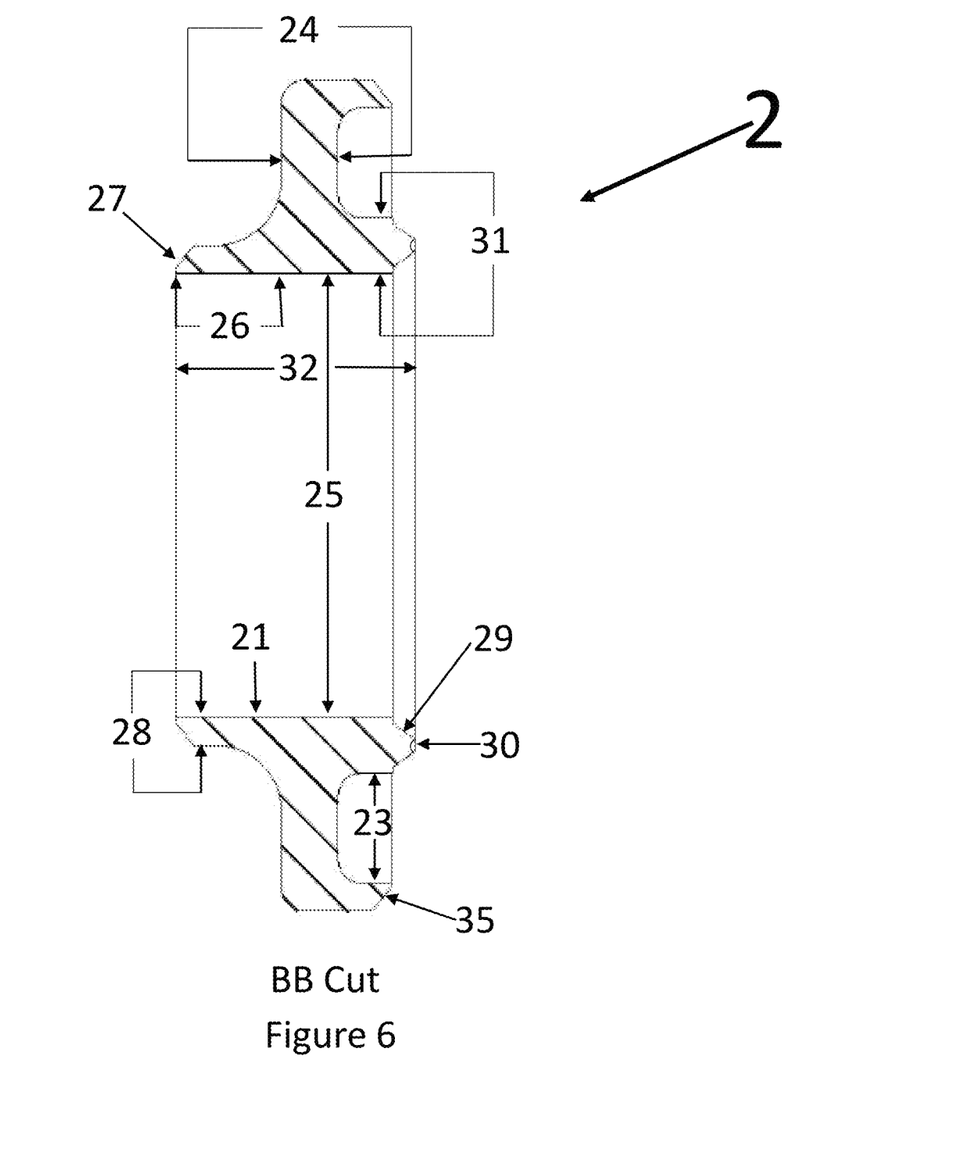
FIG. 6: Part 2. Section BB of the Front View

Part 2 (FIGS. 4, 5 and 6):

Part (2) is formed by two concentric rings, an outer (20) and an inner ring (21), joined together by a solid steel mantle (22). The clearance between these rings (23) should be at least 50 millimeters. The thickness of the sheet (24) joining the two rings should be at least twice the pipe thickness (40, 41).

The inner ring (21) corresponds to the area of the device through which the fluid carried by the pipe (50) travels and thus, it should have the same inner diameter (25) as the diameter of the pipe (38), this inner ring (21) is welded to the pipe (43) on a beveled (27) welding collar (26) of the same thickness (28) as the thickness of the pipe (40, 41). In this inner ring (21) there is a guide wedge (29) protruding from the part and serves for coupling and matching with part (1), the end side of the guide wedge has a concavity (30) which confines the cylindrical fluorelastomer ring (45) to the concave bottom (9) of the cavity (8) of the part (1), the thickness (31) of the area where tis inner ring (21) joints with the part (1) must be at least twice the thickness of the pipe (40, 41). The width (32) of this inner ring (21) must correspond at least to the width of the guide wedge (29)+20 millimeters+twice the thickness of the pipe (40, 41)+the width of the welding neck (26).

The outer ring (20) has a minimum outer diameter (33) equivalent to the inner diameter of the pipe (38)+100 mm+6 times the pipe wall thickness (40, 41). The width (34) of the outer ring (20) should be at least 23.5 millimeters+twice the pipe thickness (40, 41). The outer ring (20) must have a beveled finishing (35) to be or welded to the outer ring (3) of the part (1).

Figure 7:
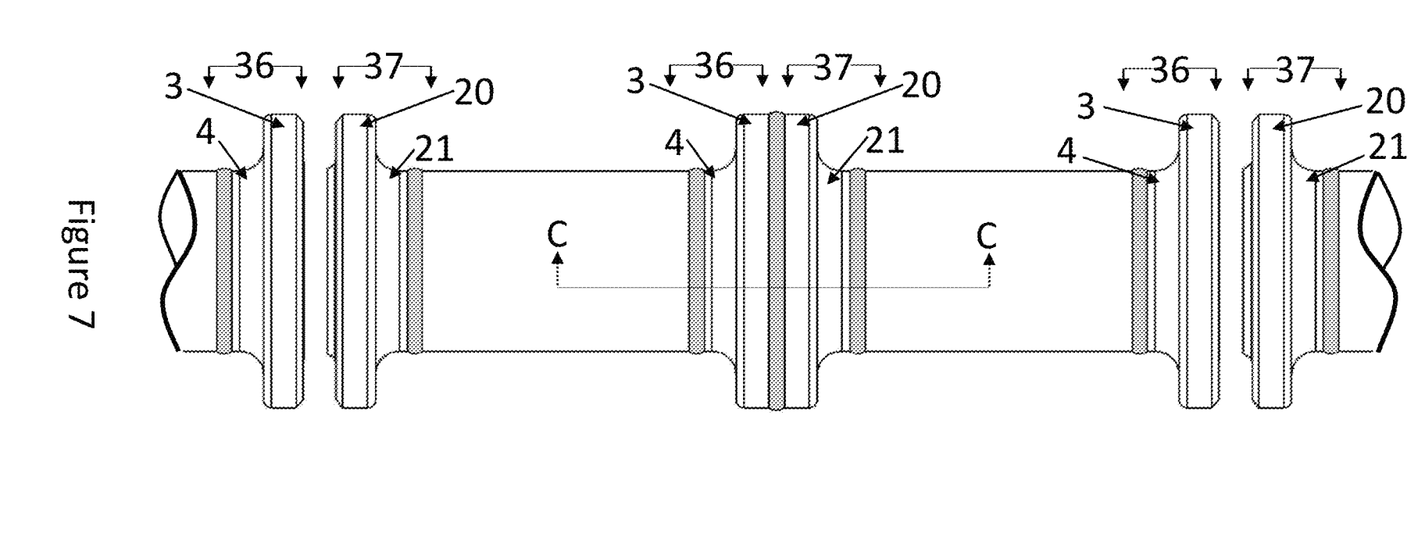
FIG. 7: Pipes Alignment and Assembly

FIG. 7 shows the alignment of the pipes in the field and finished system with the relevant fittings. The fitting (36) corresponds to the end side of the pipe coupled to the part (1) and the fitting (37) corresponds to the end side of the pipe coupled to the part (2).

Figure 8:
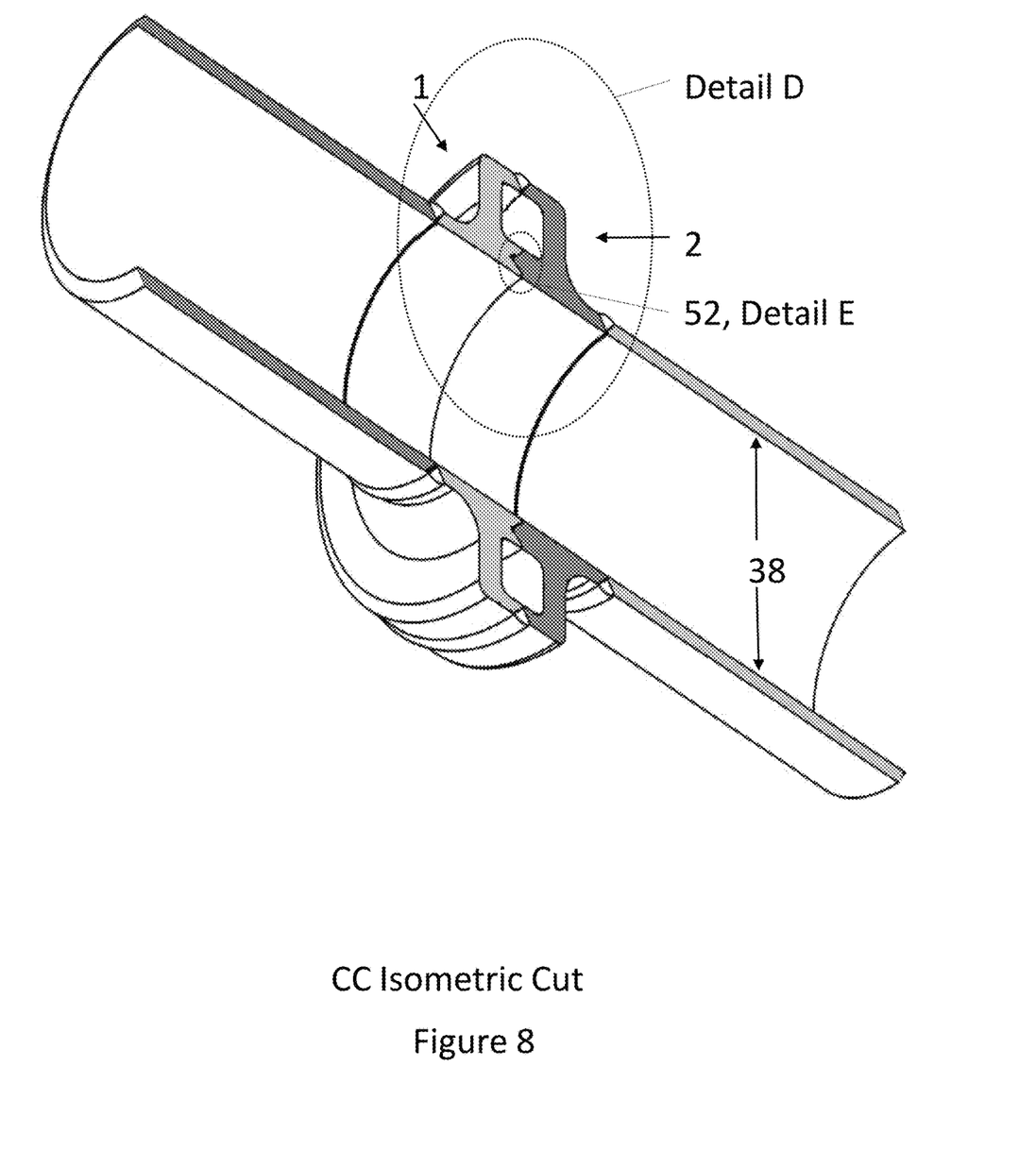
FIG. 8: Isometric Section CC of FIG. 7

FIG. 8 shows a cross-sectional view of the device coupled to an inner diameter pipe (38).

Figure 9:
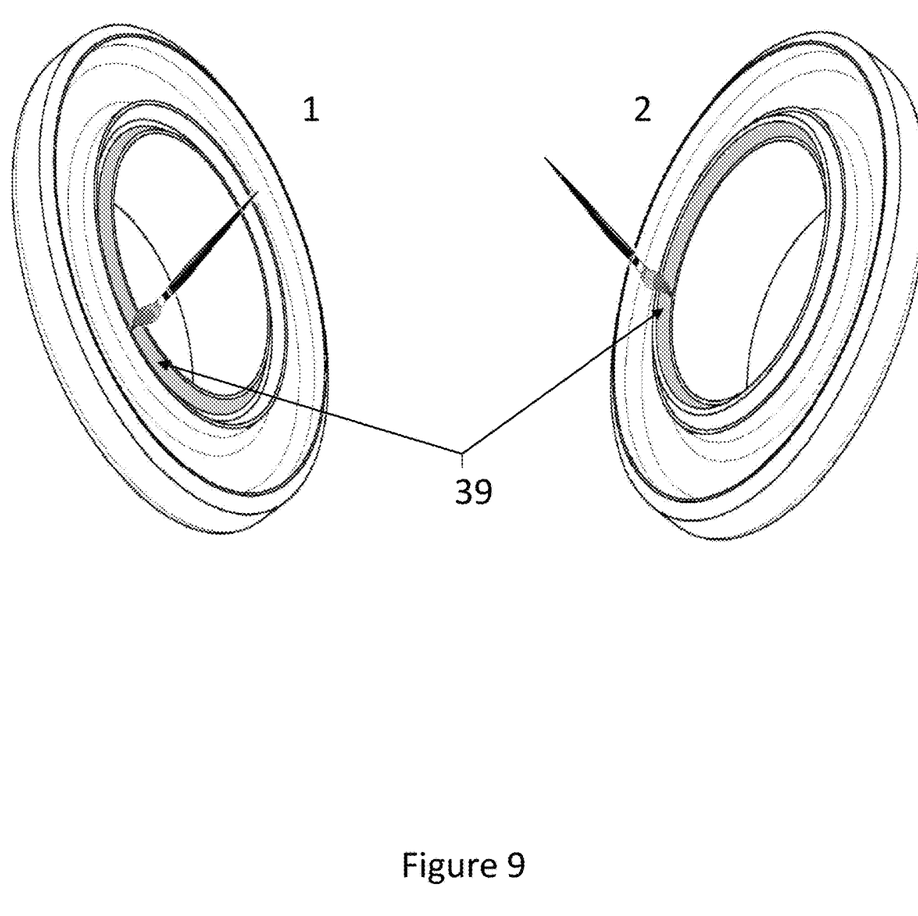
FIG. 9: Zone of the adhesive seal in Inner Rings of Parts 1 and 2

FIG. 9 shows the area of the surfaces (39) of the parts (1 and 2) where the epoxy seal is applied.

Figure 10:
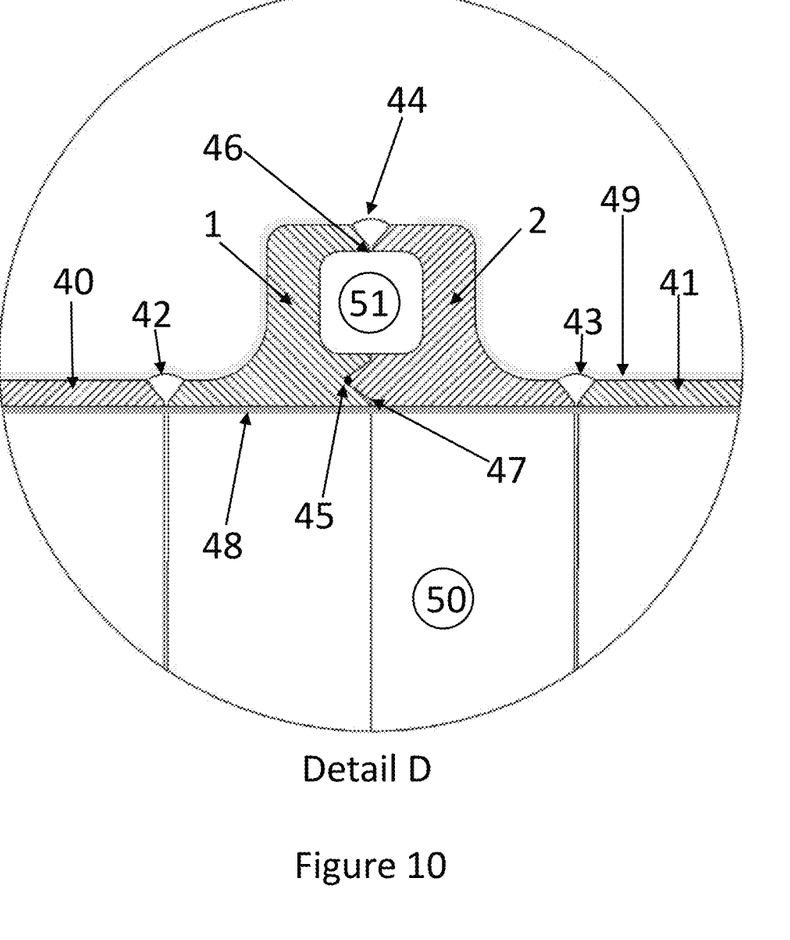
FIG. 10: Details of Parts 1 and 2 of the assembled device

FIG. 10 shows a section and details of the welded device. The description of these is as follows:

(40 and 41): Main pipe, wall thickness specified by the engineering.

(42): Welded joint of the pipe with part 1 of the beveled device 38° ANSI B 16.5.

(43): Welded joint of the pipe with part 2 of the beveled device 38° ANSI B 16.5.

(44): Area where the outer rings of parts 1 and 2 of the device are welded, both with bevel 38° ANSI B 16.5.

(45): Cylindrical fluorelastomer ring for joint tightness. The manufacturing material of the ring is known as Viton and has high chemical resistance.

(46): A 2 to 3 millimeters' clearance between the outer ring (3, 20) bevels in the weld of part 1 with part 2.

(47): Surface of the crevice between parts 1 and 2 of the device, where the epoxy seal is applied (FIG. 9).

(48): Internal surface of the pipe, painted in the workshop.

(49): External surface of the pipe, painted in the workshop.

(50): Internal zone of the pipe through which the fluid passes.

(51): Confined space between parts 1 and 2.

(1): Part 1 of the device.

(2): Part 2 of the device.

Figure 11:
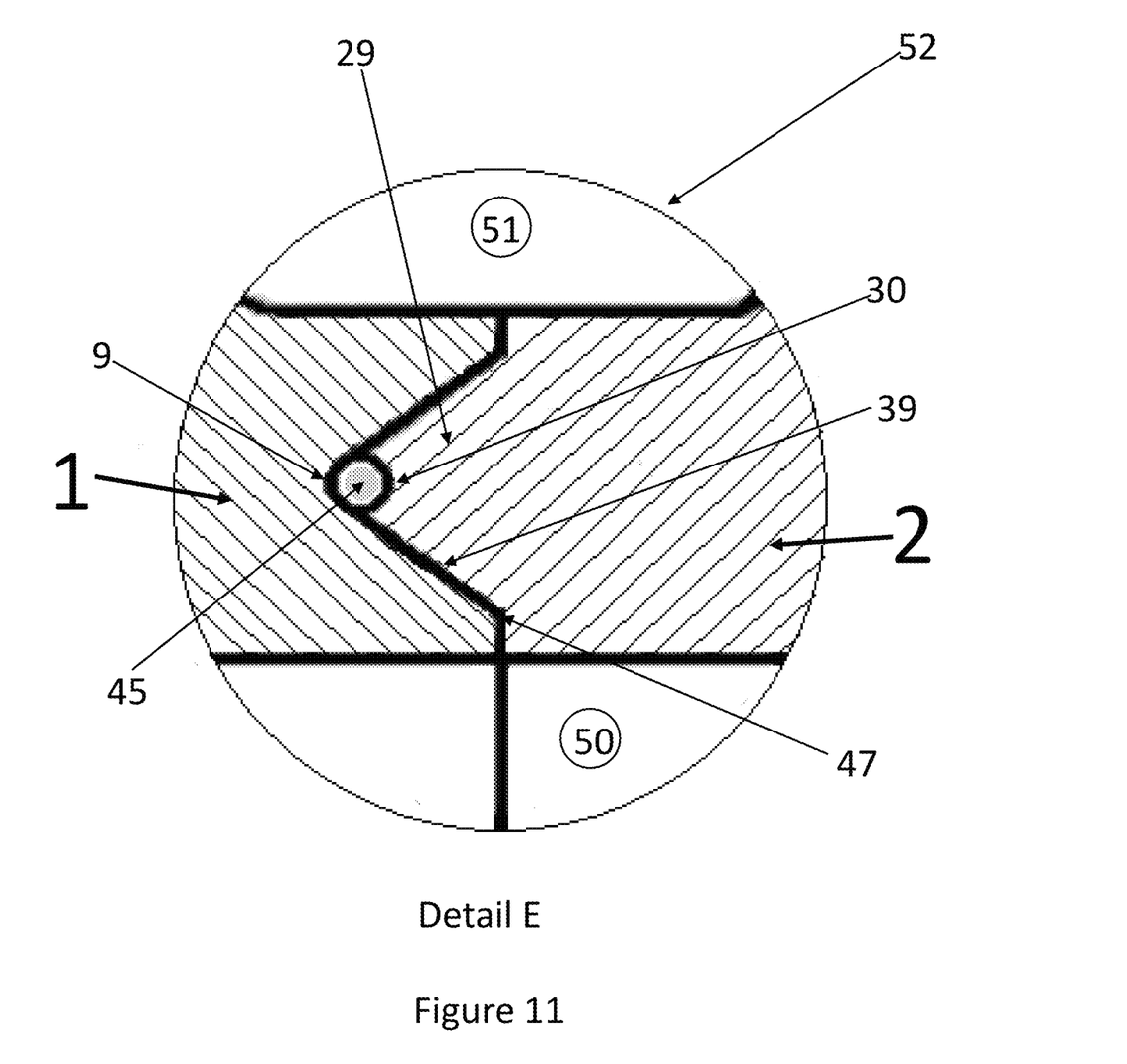
FIG. 11: Details of the assembly zone between Parts 1 and 2

FIG. 11 shows a detail of the assembly area between the inner rings (4 and 21) of parts 1 and 2. This detail shows the fit between the guide wedge (29) of part 2 and the cavity (8), of the part 1 for the confinement of the fluorelastomer ring (45) and surfaces protected (39) by the epoxy seal.

Figure 12:
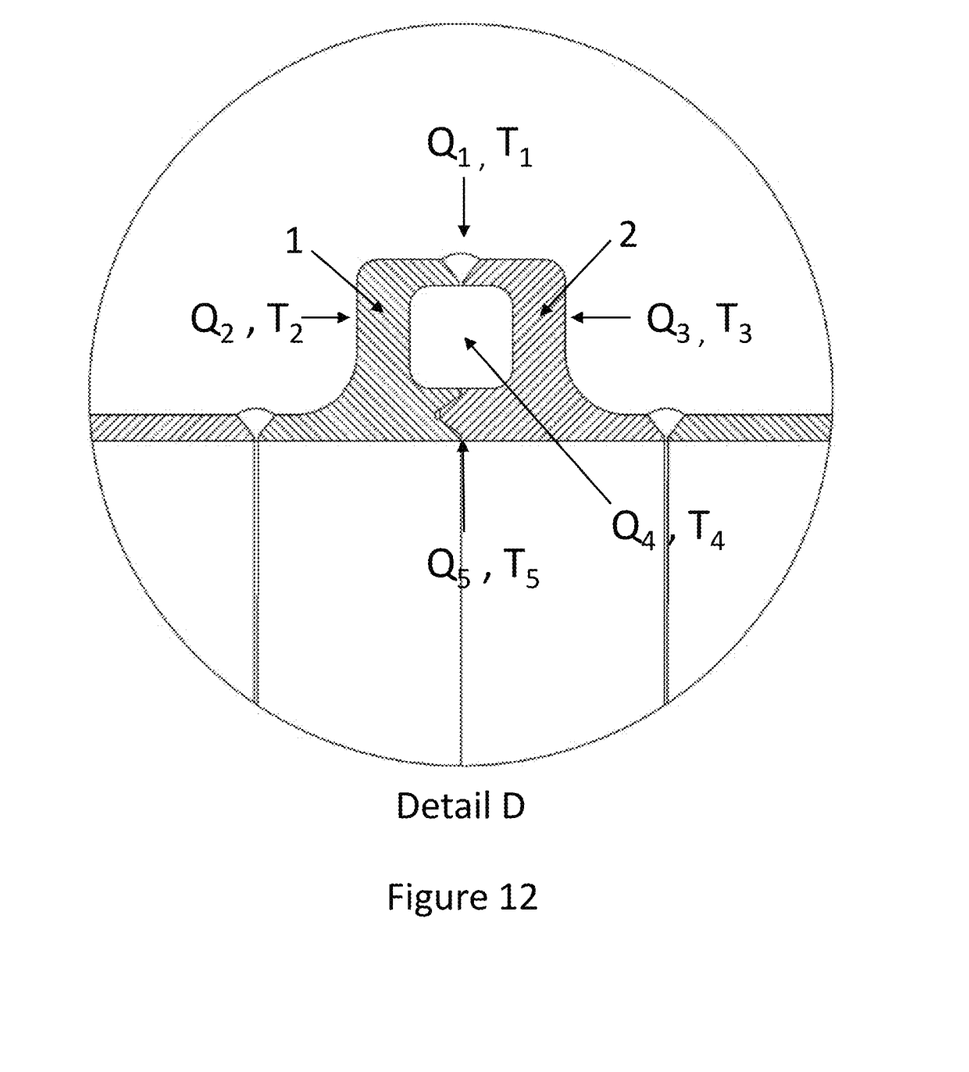
FIG. 12: Scheme of heat and temperature dissipation and distribution in the welding point ($Q_1$, $T_1$) between Parts 1 and 2

FIG. 12 shows the schematic design of natural and spontaneous heat dissipation of the weld. In this, Q1 and T1 represent the amount of heat and temperature at the welding point; Q2 and T2 the amount of heat and temperature that is dissipated by part 1 of the device; Q3 and T3 the amount of heat and temperature being dissipated by the part 2 of the device; Q4 and T4, the amount of heat and temperature that radiates to the confined space between the parts 1 and 2 of the device, and Q5 and T5 the amount of heat and temperature reaching the inner wall (48), of the pipe.

The back up in terms of dimensions, shape and design of the device proposed by this patent application was based on a calculation report and a finite elements modeling of the distribution of heat generated at the welding point. Both methods confirm the hypothesis that gave rise to this patent application, regarding the natural and spontaneous dissipation of the heat at the welding point achieved by this device according to its design, and indicate that the maximum temperature in the inner wall of the pipe does not exceed 120° C.+/−20° C., a temperature range that remains constant and reproducible for any pipe diameter greater than 152.4 millimeters (6").

According to the above, prototypes were made for pipes of 203.2 millimeters (8") in diameter, Schedule 40, and the results of practical tests assisted by thermography, showed a maximum temperature on the inner wall of the pipe (48) of 108° C. with MIG welding system and 133° C. with Arc welding system.

In the figures and description, we can see how to prevent:

The fluid transported by the pipe (50) from entering the confined space of the device (51) with the use of the cylindrical fluorelastomer ring (45).

The crevice corrosion (47) between parts 1 and 2, which is exposed to the fluid transported by the pipe (50) by applying a firm and adhesive epoxy seal to the surface of both Parts (FIG. 9).

In any given project, the engineers design the coating according to the chemical and physical requirements of the fluid transported by the pipe and, as this patent application allows the use of all types of paint, including AWWA and other related standards, it gives the engineers the technical independence to select the most suitable coating without being damaged or destroyed, eliminating the risk of corrosion in welded joints.

Device Assembly Procedure:

Before treating the pipes in the workshop with abrasive blasting and the application of coating, a part 1 is welded (42) to one end and a part 2 is welded (43) to the opposite end, both parts being left as fittings (36 and 37) of each pipe. After the parts have been welded all weld slag and blobs must be removed.

Prior to the treatment with abrasive blasting and painting the inner side of parts (1 and 2) of both fittings must be protected. With the parts (1 and 2) protected, all the surfaces of the pipe and parts (1 and 2), must be treated with abrasive blasting and then apply the coating as specified by the engineering, both joints being welded (42 and 43), protected by the coating and, therefore, eliminating all possible electrochemical corrosion of the areas affected by heat (ZAC) produced in the welding process.

Once the paint is cured, the protection of the parts (1 and 2) of both fittings must be removed and a highly adhesive epoxy seal (FIG. 9) is applied to the entire internal area of the contact surfaces between them (39), protecting the device from any possible crevice corrosion.

The epoxy seal must have the following properties:

Excellent adhesion to carbon steel surfaces.

Be of liquid consistency, with a thixotropy suitable to ensure an adequate protection thickness to the surfaces that form the crevice.

No solvents or toxic elements content.

Be highly resistant to water, salts and chemicals.

The pipes, coated in the inside and outside as stated in the engineering specifications, are taken to the field and aligned in such a way that the fitting (36) joint to the part (1) of a pipe is faced with the fitting (37) joint to the part (2) of the adjacent pipe (FIG. 7).

Assembling the fitting (36) of one pipe with the fitting (37) of another pipe produces a continuous separation of 2 to 3 millimeters (46) throughout the perimeter of the central bevel of the outer rings (3 and 20) of both fittings, and the joint (44) is welded.

The installation of the device (parts 1 and 2 welded in the workshop) allows the elimination of slag and weld blobs from this process and therefore, eliminate the risk of internal corrosion in the zone where joints of parts 1 and 2 are welded to the pipe, that is to say, the working procedure offers full guarantee in terms of decontamination and elimination of any impurity and/or obstruction, hampering the free flow of the fluid transported by the pipe (50).

The invention claimed is:

1. A device to be installed in pipes, that eliminates internal corrosion in the welded joints because it prevents the damage of the welding heat to the inner coating of said pipes by dissipating it naturally and spontaneously, comprising a first part (1) which is assembled to a second part (2) producing a confined space (51) where both parts (1 and 2) are formed by two concentric rings, an inner ring (4, 21) of the same diameter as the pipe (38), and an outer ring (3, 20) with the rings joined together by a solid steel mantle (5, 22); the inner ring (4) has a cavity (8) where a guide wedge (29) of the inner ring (21) is assembled and at the bottom of the cavity (8) of the first part (1) there is a concavity (9) to accommodate an fluor elastomer ring (45) and at the end of the guide wedge (29) of the second part (2) there is a concavity (30) confining said ring of fluor elastomer (45) to the concavity (9), and the inner area of the contact surfaces (39) between the inner rings (4, 21) are protected with a highly adhesive epoxy seal, a separation of 2 to 3 millimeters (46) is achieved between the outer rings (3, 20) where the welded joint (44) is done, wherein the width (10, 23) of the solid steel mantle (5, 22) that separates the inner and outer rings of the first part and the second part is at least 50 mm and the thickness (14, 24) of this solid steel mantle (5,22) as well as the thickness of the assembly area (52) between the cavity (8) of part (1) and the guide wedge (29) of part (2) is at least twice the thickness of the pipe (40, 41).

2. The device according to claim 1, wherein the inner ring (4) has a minimum width (12) corresponding to 30 millimeters plus twice the thickness of the pipe (40, 41) plus the width of a welding neck (18).

3. The Device according to claim 1, wherein the inner ring (21) has a minimum width (32) corresponding to the width of the guide wedge (29) plus 20 mm, plus twice the thickness of the pipe (40, 41) plus the width of a welding neck (26).

4. The device according to claim 1, wherein the outer rings (3 and 20) have a minimum outer diameter (11 and 33) equivalent to the inner diameter of the pipe (38) plus 100 millimeters, plus 6 times the pipe thickness (40, 41) and the minimum width (16 and 34) of these rings is at least 23.5 millimeters plus twice the thickness of the pipe (40, 41).

5. The device according to claim 1, wherein the ring of fluor elastomer (45) remains compressed between the concavity (9) of the first part (1) and the concavity (30) of the second part (2).

6. The device according to claim 1, wherein the contact area (39) of both faces of the inner rings (4, 21) where the epoxy seal is applied has a minimum separation of 0.5 millimeters with a maximum clearance of +/−20% which prevents electrical contact between the faces forming a crevice (47), preventing crevice corrosion in the device.

* * * * *